United States Patent [19]

Hahn

[11] Patent Number: 5,009,522
[45] Date of Patent: Apr. 23, 1991

[54] REDUCED FLOW BEARING

[76] Inventor: Charles J. Hahn, Mt. Clemens, Mich.

[73] Assignee: General Motors Corporation, Detroit, Mich.

[21] Appl. No.: 502,723

[22] Filed: Apr. 2, 1990

[51] Int. Cl.$^5$ .............................................. F16C 33/10
[52] U.S. Cl. .................................. 384/288; 384/273; 384/291
[58] Field of Search ............... 384/288, 273, 294, 291, 384/373, 399

[56] References Cited

U.S. PATENT DOCUMENTS

| | | | |
|---|---|---|---|
| 3,449,028 | 6/1969 | DeHart | 384/288 |
| 3,625,580 | 12/1971 | DeHart et al. | |
| 3,743,367 | 7/1973 | Raimondi | |
| 4,152,032 | 5/1979 | Pierpoline et al. | |
| 4,235,481 | 11/1980 | Fukuoka et al. | 384/288 |
| 4,302,060 | 11/1981 | Nicholas et al. | |
| 4,311,349 | 1/1982 | Roberts | 384/288 |
| 4,741,631 | 5/1988 | Terkovich | 384/273 |

Primary Examiner—Lenard A. Footland

[57] ABSTRACT

An engine bearing for internal combustion engines having a semi-cylindrical shell portion with an inwardly facing bearing surface, adapted to surround a journal, which is divided circumferentially into a concentric central portion and a pair of eccentric end portions. The eccentric end portions extend outwardly from the opposite ends of the central portion a progressively increasing distance to the ends of the shell to form a split line relief portion. An eccentric lubricant supply groove is formed in the inwardly facing bearing surface tapering from a point of maximum depth at the central portion of the shell to terminate within each of the eccentric end portions thereby forming lubricant metering orifices at the interface of the concentric central portion, the eccentric end portions and the eccentric lubricant supply groove to control the flow of lubricant to the split line and reduce the pressure loss through the bearing.

6 Claims, 2 Drawing Sheets

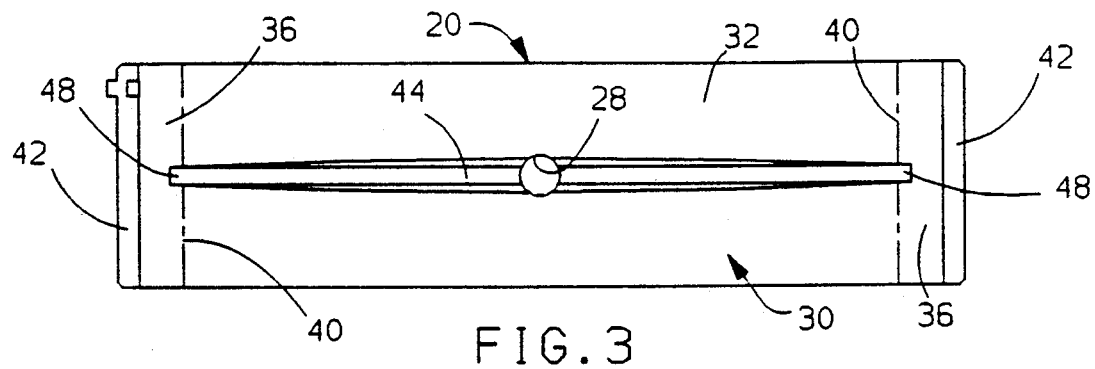
FIG. 3
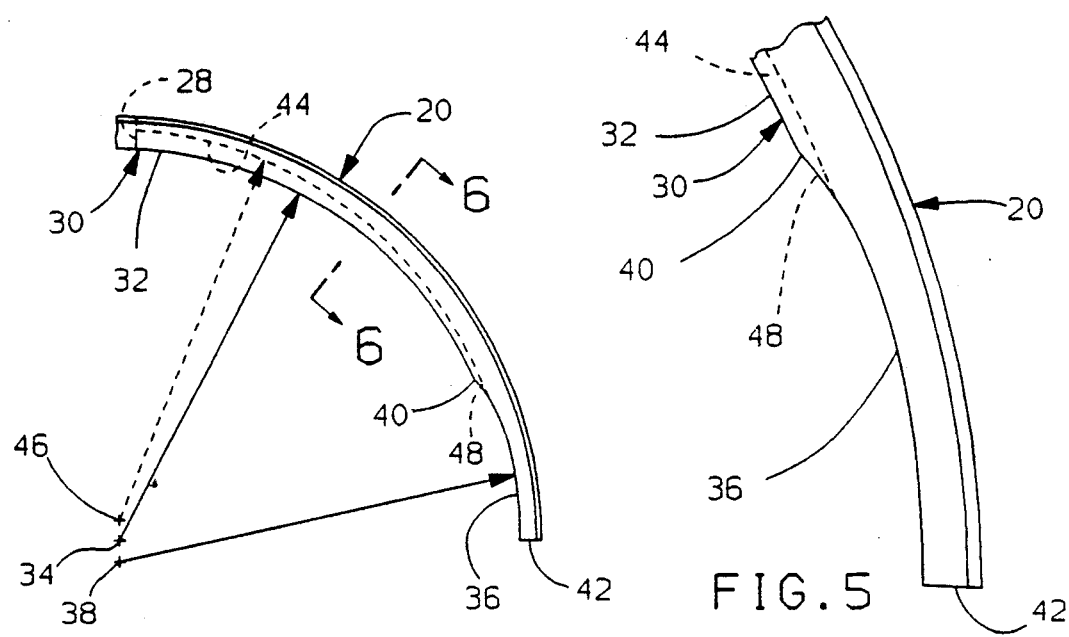
FIG. 4
FIG. 5
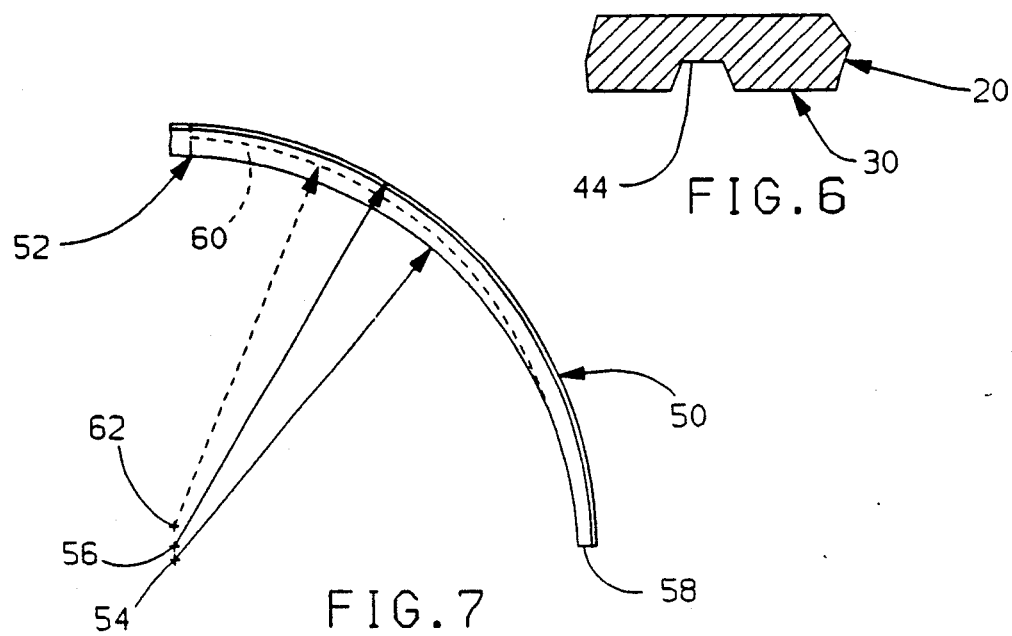
FIG. 6
FIG. 7

REDUCED FLOW BEARING

BACKGROUND OF THE INVENTION

1. Field of the Invention

The present invention relates to a journal bearing for an internal combustion engine and, more particularly, to a journal bearing having an eccentric lubricant supply groove which meters the flow of lubricant through the bearing.

2. Description of the Relevant Art

Typical internal combustion engines utilize journal bearings to mount the crankshaft in the block and to secure the connecting rods to the crank pin journals. The journal bearings typically comprise a pair of semicircular inserts or bearing shells which are retained in a cylindrical bore in the connecting rod or block, wherein half of the bore is formed by a removable cap provided to permit assembly of the journal and the bearing shells within the bore. Recesses formed at the split line between the two semicircular inserts are provided to prevent excessive wear or failure of the insert caused by "close-in" or slight misalignment of the shells during assembly. Without such split line recess, the reduction in bearing clearance at the split line may result in excessive wear or failure of the insert.

Also typical of journal bearings used in internal combustion engines, is the provision of a lubricant supply groove formed in the upper bearing shell which is connected, through a lubricant supply passage, to the oil gallery of the engine. The lubricant supply groove assures an adequate supply of oil to establish a lubricating film between the journal and the inner face of the bearing shell. The lubricant supply groove will typically extend along the entire inner circumference of the bearing shell resulting in a substantial flow path of lubricant to the split line and a correspondingly substantial oil pressure penalty which affects the engine's entire lubricating system.

SUMMARY OF THE INVENTION

In accordance with the present invention, a journal bearing for use in an internal combustion engine is disclosed. The bearing supports a rotatable journal within a cylindrical opening which is defined by a pair of semicircular bearing shells which are maintained in endwise abutment at a split line. The inwardly facing bearing surfaces of the bearing shells are adapted to surround the supported journal member in a close fitting bearing relationship with clearance provided therebetween for a load carrying lubricating oil film. The inner bearing surface of at least one bearing shell is divided circumferentially into a concentric central portion, which is equidistant at all points from the central axis of the bearing member and which extends circumferentially for a predetermined angular distance, and a pair of eccentric end portions which extend outwardly from the opposite ends of the central portion and which provide a progressively increasing clearance between the supported journal and the inner bearing surface from the ends of the central portion to the ends of the bearing shell.

To assure a supply of lubricant adequate to establish the desired load carrying, lubricating oil film between the journal and the bearing a circumferentially extending lubricant supply groove is formed in the inwardly facing bearing surface. The groove is centered on an axis eccentric from the central axis of the bearing, causing the groove to taper from a point of maximum depth at the center of the bearing shell to terminate within each of the eccentric end portions intermediate the ends of the concentric central portion and the ends of the shell. As a result, lubricant metering orifices are formed at the interface of the concentric central portion, the eccentric end portions, and the eccentric lubricant supply groove to control the flow of lubricant from the groove to the split line thereby reducing the pressure loss within the oil gallery of the engine.

The volume of lubricant flowing through the bearing depends upon the predetermined angular dimensions of the concentric central portion and the lubricant supply groove. By varying these dimensions the flow characteristics can be tailored to the specific engine application.

Other objects and features of the invention will become apparent by reference to the following description and to the drawings.

BRIEF DESCRIPTION OF THE DRAWINGS

FIG. 3 is a plan view of the bearing shell of FIG. 2, showing the inner bearing surface;

FIG. 4 is a side view of the bearing shell embodying the present invention;

FIG. 5 is an enlarged view of the circled area of FIG. 4;

FIG. 6 is a sectional view of the bearing taken along line 6—6 of FIG. 4;

FIG. 7 is a side view of a second embodiment of the bearing shell embodying the present invention.

DESCRIPTION OF THE PREFERRED EMBODIMENTS

Figure 1:
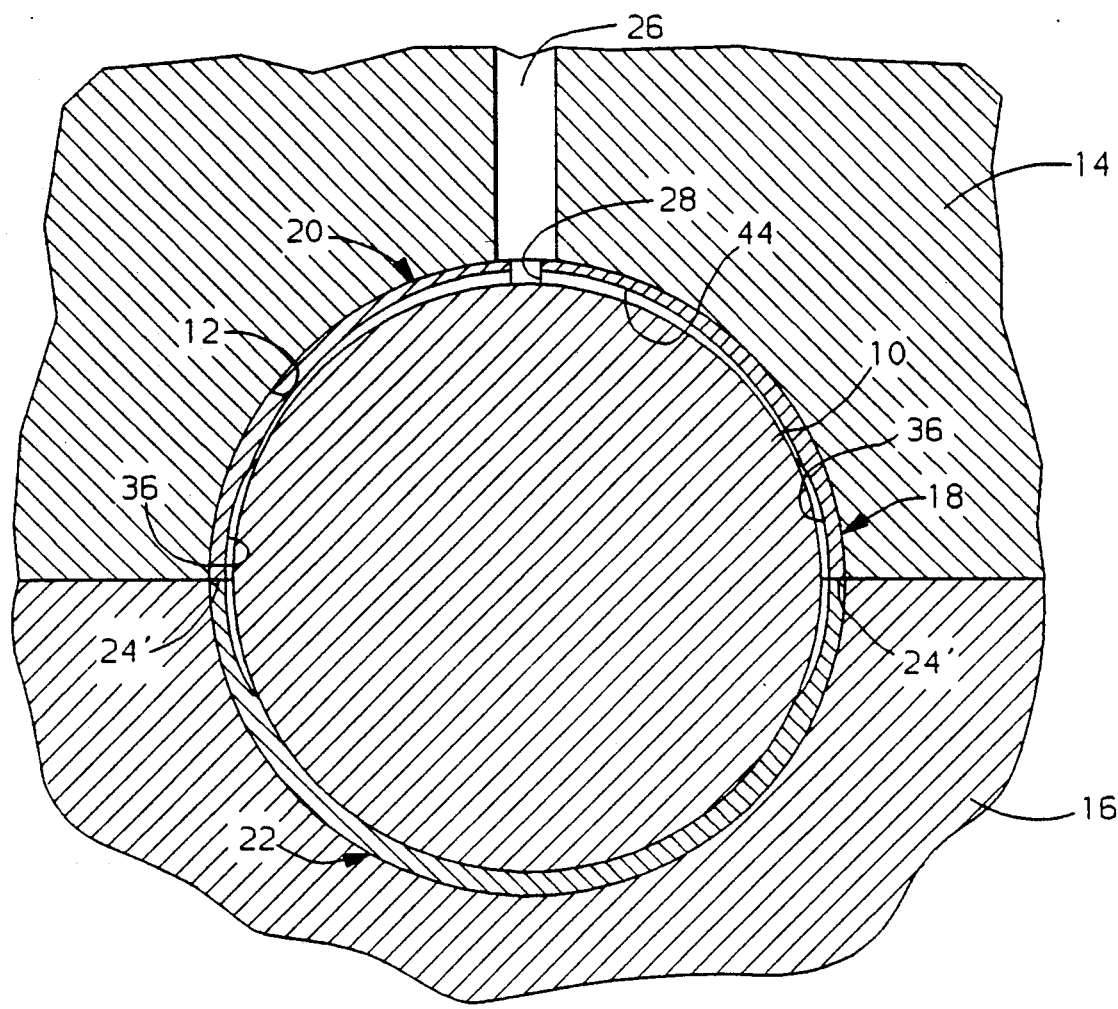
FIG. 1 is a sectional view of a crankshaft journal and its associated bearing embodying the present invention.

In FIG. 1 there is shown a crankshaft main journal 10 rotatably carried within cylindrical bore 12 defined by cylinder block 14 and detachable bearing cap 16. Fixedly secured within each cylindrical bore 12, in rotatable bearing contact with crankshaft journal 10, is a journal bearing, designated generally as 18. The bearing 18 comprises a pair of semicircular bearing shells or inserts 20 and 22 which meet in endwise abutment at split line 24. Clearance is provided between the bearing 18 and journal 10 for the formation of a lubricating oil film therebetween, so as to prevent direct contact during rotation. An oil supply channel 26, supplies lubricating oil from the oil gallery of cylinder block 14 to the bearing 18 through a lubricant supply opening 28 in bearing shell 20.

In a preferred embodiment, shown in FIGS. 4 and 5, the inwardly facing bearing surface 30 of bearing shell 20 is divided circumferentially into a concentric central portion 32 which is centered on the central axis 34 of cylindrical bore 12, and a pair of eccentric end portions 36 having an axis 38 eccentric to central axis 34. The concentric central portion 32 is equidistant at all points from the central axis 34 and extends circumferentially for a predetermined angular distance to terminate at concentric end portions 40. The eccentric end portions 36 extend progressively outwardly from each end 40 of concentric central portion 32 to terminate at the ends 42 of the bearing shell 20. The actual curvature of the eccentric end portions 36 will depend on the location of axis 38. The eccentric end portions 36, which extend the entire axial length of the bearing shell 20, provide a radial relief at the split line 24 which prevents bearing failure due to close-in of the shells at the split line, caused by deformation of cylindrical bore 12 due to fluctuating loads, or due to slight misalignments of the shell ends during assembly.

Figure 2:
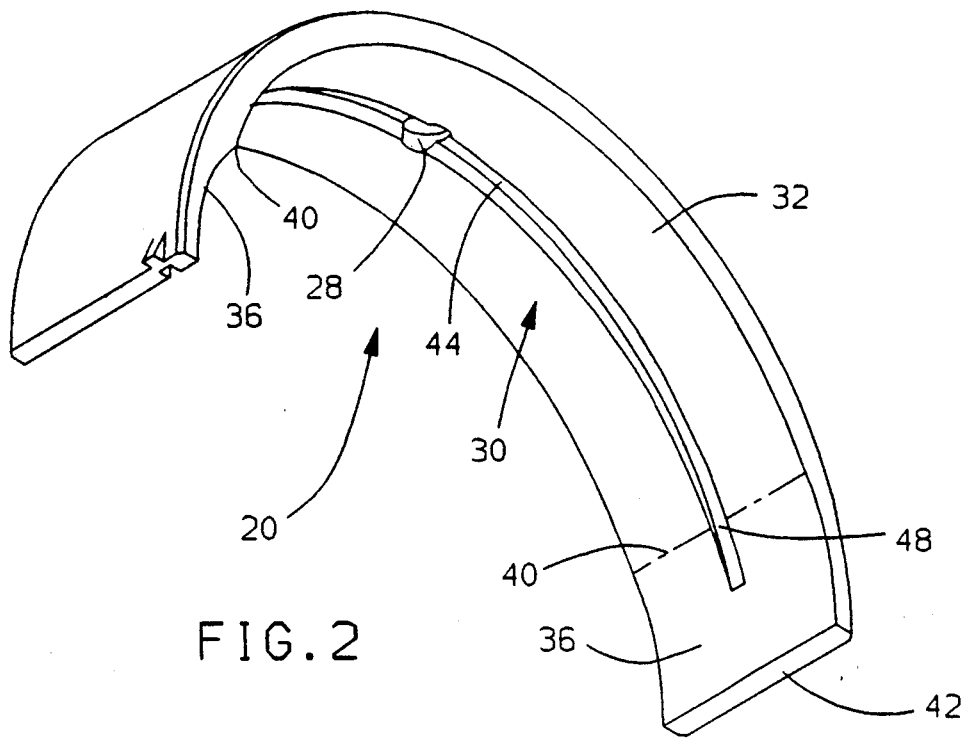
FIG. 2 is a perspective view of an engine bearing shell embodying the present invention.

To assure an adequate supply of lubricant to establish the required lubricating film between main journal 10 and bearing 18, a lubricant supply groove 44, shown in FIGS. 2 and 3, is formed in the inner bearing surface 30 of bearing shell 20. The supply groove 44 is centered on an axis 46, see FIG. 4, which is eccentric to the central bearing axis 34. As a result, the groove tapers from a point of maximum depth at the center of the concentric portion 32 to terminate at a position intermediate the center of the bearing and its ends 42. To provide an adequate flow of lubricant through the bearing, thereby preventing dirt and contamination from collecting between the inner bearing surface 30 and the journal 10, eccentric axis 46 is located so that lubricant supply groove 44 terminates within each of the eccentric end portions 36 thereby forming lubricant metering orifices 48 at the interface of the concentric central portion 32, the eccentric end portions 36 and the eccentric lubricant supply groove 44. The result is a reduction in oil pressure loss normally associated with journal bearings having lubricant supply grooves which extend to the split line, providing an increase in efficiency since less engine power is required to maintain oil pressure. Conversely, the provision of the lubricant metering orifices allows a controlled flow of lubricating oil to pass through the bearing to prevent the build-up of harmful dirt and deposits therein. A principle advantage of the present invention is the ability to tailor the lubricant flow rate through the bearing 18 by varying the eccentricity of axis 46 to change the groove termination point and, consequently, the size of metering orifices 48. The result is a journal bearing which can be made to suit specific design applications.

To further enhance lubricating characteristics, supply groove 44 may be formed with chamfered edges, as shown in FIG. 6. The chamfer causes a reduction in the axial dimension of groove 44, see FIG. 3, as the depth diminishes. The resulting lubricant supply groove 44 has a relatively large volume near the center of the bearing capable of supplying substantial lubricant and a relatively small volume at each end where the lubricant passes through the metering orifices 48.

A second embodiment of the journal bearing of the present invention is shown in FIG. 7. In FIG. 7 the bearing shell 50 has an inwardly facing bearing surface 52 having an arcuate cross section which is centered on an axis 54 which is eccentric from the central bearing axis 56. Due to the eccentric offset of the inner surface 52, the clearance between the journal and the inner bearing surface 52 increases progressively from the center of the bearing to its outer ends 58. The increased clearance eliminates the need for distinct eccentric end portions as described above.

Lubricant supply groove 60 is formed in the inner bearing surface 52, and is centered on axis 62, which is eccentric to the central axis 56 of the bearing. Similar to the above embodiment, the lubricant supply groove 60 tapers from a point of maximum depth at the center of the bearing to terminate at a position intermediate the center of the bearing and its ends 58. In this embodiment, as the inner bearing surface clearance increases towards the shell ends 58, it provides a flow path to the split line for the pressurized lubricant within the tapering lubricant supply groove 60. By varying the eccentricity of the groove 60, and therefore the distance that the groove extends into the steadily increasing bearing clearance before terminating, the rate of lubricant flow through the bearing can be controlled. As a result, pressure loss at the split line due to the oil grove extending the full length of the bearing is reduced while continuing to provide lubricant flow through the bearing which is necessary to prevent dirt and contamination from collecting in the bearing.

Although the above description is to an upper bearing shell of a crankshaft main journal bearing, the invention is not limited to that application. The bearing of the present invention is useful in any bearing application where lubrication requirements necessitate substantial supply of lubricant to the bearing and where it is desirable to reduce the pressure loss normally associated with journal bearings having lubrication supply grooves that extend to the split line.

While certain embodiments of the invention have been described in detail above in relation to a reduced flow bearing, it would be apparent to those skilled in the art that the disclosed embodiment may be modified. Therefore, the foregoing description is to be considered exemplary, rather than limiting, and the true scope of the invention is that described in the following claims.

The embodiments of the invention in which an exclusive property or privilege is claimed are defined as follows:

1. A journal bearing for internal combustion engines wherein a rotatable journal is received within a cylindrical opening defined jointly by a pair of detachably secured members, said bearing comprising:

a semi-cylindrical bearing shell adapted to be opposedly received within said opening to define a generally semi-cylindrical, inwardly facing bearing surface adapted to surround a portion of said journal in close fitting bearing relationship with clearance for formation therebetween of a load carrying lubricating oil film;

said inwardly facing bearing surface divided circumferentially into a concentric central portion and a pair of eccentric end portions, said portions each extending axially the full width of said surface, said concentric central portion being equidistant at all points from said central axis and extending circumferentially a predetermined angular dimension, said eccentric end portions extending outwardly from the opposite ends of said central portion and of progressively increasing distance from said central axis toward the ends of said bearing shell of said shell;

said inwardly facing bearing surface further having an eccentric lubricant supply groove extending circumferentially a predetermined angular dimension larger than said concentric central portion, said groove tapering from a point of maximum depth within said concentric central portion to terminate within each of said eccentric end portions thereby forming lubricant metering orifices at the interface of said concentric central portion, said eccentric end portions and said eccentric lubricant supply groove to meter the flow of lubricant from said groove to said eccentric end portions; and a lubricant supply opening extending through said bearing shell to intersect said supply groove for supplying lubricant from an external source to said bearing.

2. A journal bearing, as defined in claim 1, wherein the edges of said eccentric lubricant supply groove are chamfered to provide a decreasing axial groove dimension as the depth of said groove is reduced.

3. A journal bearing for internal combustion engines and the like wherein a rotatable journal is received within a cylindrical opening defined jointly by a pair of detachably secured members, said bearing comprising:
 a semicircular bearing shell adapted to be opposedly received within said opening to define a generally semi-cylindrical, inwardly facing bearing surface adapted to surround a portion of said journal in close fitting bearing relationship with clearance for formation therebetween of a load carrying lubricating oil film;
 said inwardly facing bearing surface having an arcuate cross section which is centered on an axis eccentric from the central axis of said bearing, said clearance between the journal and said bearing surface progressively increasing from the center of said shell to its outer ends said inwardly facing bearing surface further comprising an eccentric lubricant supply groove, extending circumferentially a predetermined angular dimension, which tapers from a maximum depth at the center of said bearing shell to terminate at a location intermediate of said center of bearing shell and said ends of said bearing shell to form lubricant metering orifices of the ends of said groove; and
 a lubricant supply opening extending through said bearing shell to intersect said supply groove for supplying lubricant from an external source to said bearing;
 wherein the volume of lubricant passing through said lubricant metering orifices, and said bearing shell, is a predetermined value dependent upon the eccentricities of said inwardly facing bearing surface and said lubricant supply groove.

4. A journal bearing, as defined in claim 3, wherein the edges of said eccentric lubricant supply groove are chamfered to provide a decreasing axial groove dimension as the depth of said groove is reduced.

5. A journal bearing for internal combustion engines and the like wherein a rotatable journal is received within a cylindrical opening defined jointly by a pair of detachably secured members, said bearing comprising:
 a semi-cylindrical bearing shell adapted to be opposedly received within said opening to define a generally semi-cylindrical, inwardly facing bearing surface adapted to surround a portion of said journal in close fitting bearing relationship with clearance for formation therebetween of a load carrying lubricating oil film;
 said inwardly facing bearing surface having a non-round cross-section configured to provide greater clearance between the journal and said bearing surface at the outer ends of said shell than at the center of said shell;
 an eccentric lubricant supply groove extending circumferentially a predetermined angular dimension and tapering from a maximum depth at a point between the groove ends to terminate at a location intermediate of said center of said bearing shell and said ends of said bearing shell to form lubricant metering orifices at said ends of said groove; and
 a lubricant supply opening extending through said bearing shell to intersect said supply groove for supplying lubricant from an external source to said bearing;
 wherein the volume of lubricant passing through said lubricant metering orifices, and said bearing shell, is a predetermined value dependent upon the clearance between the journal and said bearing surface at the end of said lubricant supply groove.

6. A journal bearing, as defined in claim 5, wherein the edges of said eccentric lubricant supply groove are chamfered to provide a decreasing axial groove dimension as the depth of said groove is reduced.

* * * * *